(12) United States Patent
Borges et al.

(10) Patent No.: US 9,712,601 B2
(45) Date of Patent: Jul. 18, 2017

(54) CLOUD-CONNECTABLE MIDDLEWARE APPLIANCE

(71) Applicant: International Business Machines Corporation, Armonk, NY (US)

(72) Inventors: Gabriel P. Borges, Sumare (BR); Claude Falbriard, Cananeia (BR); Grant D. Miller, Arvada, CO (US); Nader M. Nassar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 13/947,361

(22) Filed: Jul. 22, 2013

(65) Prior Publication Data

US 2015/0026343 A1 Jan. 22, 2015

(51) Int. Cl.
*H04L 12/911* (2013.01)
*H04L 29/08* (2006.01)

(52) U.S. Cl.
CPC .................................. *H04L 67/10* (2013.01)

(58) Field of Classification Search
CPC ........ G08B 13/19682; G08B 13/19697; G08B 21/043; G08B 21/0446; G08B 31/00; G06F 2201/86; G06F 2209/5019; G06F 9/5072; G06F 9/5083; G06F 11/323; G06F 11/3419; G06F 21/53; G06F 21/6218; G06F 2209/503; G06F 2221/2101; G06F 2221/2103; G06F 9/5044; G06F 11/3003; G06F 11/3006; G06F 11/3082; G06F 11/3093; G06F 17/30023; G06F 17/289; G06F 17/30035; G06F 17/30575; G06F 19/3418; G06F 13/122; H04L 41/00; H04L 41/12; H04L 43/045; H04L 43/0811;
(Continued)

(56) References Cited

U.S. PATENT DOCUMENTS 8,893,293 B1 * 11/2014 Schmoyer ........... H04L 63/0807
455/558
9,124,635 B2 * 9/2015 Robinson ................ H04L 63/20
(Continued)

FOREIGN PATENT DOCUMENTS

WO 2008109542 A1 9/2008
WO 2009032761 A2 3/2009
WO 2009035463 A1 3/2009

OTHER PUBLICATIONS

Drago, Carlo Maria. "Systems thinking per la crescita sostenibile delle nostre città," IBM Italia, Forum Telecontrollo Torino, Nov. 3-4, 2011 <http://www.slideshare.net/canaleenergia/ibm-drago>.
(Continued)

*Primary Examiner* — Kevin Bates
*Assistant Examiner* — Ranjan Pant
(74) *Attorney, Agent, or Firm* — David B. Woycechowsky

(57) ABSTRACT

A computer system and associated method and software where communications between the cloud and a sensor device (for example, a temperature sensor) pass through and are processed by a middleware appliance. The middleware appliance creates data structures called cloud event data objects (cEDOs). A cEDO may include, for example: event data, device data, sensor data, geo key data, payload key data and data value pairs.

3 Claims, 5 Drawing Sheets

(58) Field of Classification Search
CPC ....... H04L 47/70; H04L 47/724; H04L 63/08; H04L 63/101; H04L 12/1485; H04L 41/147; H04L 41/5096; H04L 63/105; H04L 63/20; H04L 51/066; H04L 67/025; H04L 43/10; H04L 69/08; H04L 12/282; H04L 2012/2841; H04L 12/2803; H04L 12/2823; H04L 43/04; H04L 67/125; H04L 12/2807; H04L 2012/5618; H04L 67/28; H04L 67/2842; H04L 69/329; H04L 67/12; G06K 9/00228; H04W 12/06; H04W 84/12

See application file for complete search history.

(56) References Cited

U.S. PATENT DOCUMENTS

| | | | | |
|---|---|---|---|---|
| 9,225,793 | B2* | 12/2015 | Dutta | H04L 67/2804 |
| 2008/0094224 | A1 | 4/2008 | Parker et al. | |
| 2011/0154375 | A1* | 6/2011 | Helal | H04L 12/2803 719/320 |
| 2012/0110602 | A1* | 5/2012 | Sanders | G06F 15/173 719/328 |
| 2012/0197852 | A1* | 8/2012 | Dutta | H04L 67/2804 707/692 |
| 2012/0226764 | A1 | 9/2012 | Philip et al. | |
| 2012/0252405 | A1 | 10/2012 | Lortz et al. | |
| 2013/0013544 | A1* | 1/2013 | Lee | H04L 67/16 706/27 |
| 2013/0091254 | A1* | 4/2013 | Haddad | H04L 61/6059 709/220 |
| 2013/0114100 | A1* | 5/2013 | Torii | G06F 11/0733 358/1.14 |
| 2013/0304851 | A1* | 11/2013 | Vance | G05B 19/4185 709/217 |
| 2014/0172994 | A1* | 6/2014 | Raumann | H04L 51/30 709/206 |
| 2014/0181888 | A1* | 6/2014 | Li | G06F 21/62 726/1 |
| 2014/0313036 | A1* | 10/2014 | Sweeney | G08B 21/0446 340/573.1 |
| 2015/0358391 | A1* | 12/2015 | Moon | H04L 67/10 709/224 |

OTHER PUBLICATIONS

Howard, Brian Clark. "What do Recycling Symbols on Plastics Mean?", printed Apr. 16, 2013 <http://www.thedailygreen.com/print-this/recycling-symbols-plastics-460321?page=all>.

IBM. "The IBM vision of a smarter home enabled by cloud technology," IBM Sales & Distribution White Paper, Copyright IBM Corporation 2010, Jan. 2010.

IP.com Prior Art Database. "Smart Device Cloud," Authors Disclosed Anonymously, IPCOM000206936D, pp. 1-14, May 13, 2011.

Jain et al. "An Analysis of Cloud Model-Based Security for Computing Secure Cloud Bursting and Aggregation in Real Environment," International Journal of Advanced Computer Research (ISSN (print): 2249-7277, ISSN (online): 2277-7970), vol. 1, No. 1, pp. 23-27, Sep. 2011 <http://theaccents.org/ijacr/papers/sep_2011/5.pdf>.

Kehoe et al. "Smarter Cities Series: A Foundation for Understanding IBM Smarter Cities," Redbooks, REDP-4733-00, Dec. 6, 2011, Copyright IBM Corporation 2011 <http://www.redbooks.ibm.com/redpapers/pdfs/redp4733.pdf>.

Perera et al. "CA4IOT: Context Aware for Internet of Things," Proceedings of the IEEE International Conference on Green Computing and Communications, Conference on Internet of Things, and Conference on Cyber, Physical and Social Computing (iThings/CPSCom/GreenCom), Besancon, France, Nov. 2012, URL: <http://arxiv.org/abs/1301.1084v1>.

Perera et al. "Connecting Mobile Things to Global Sensor Network Middleware using System-generated Wrappers," MobiDE '12, May 20, 2012, pp. 23-30, Scottsdale, AZ, USA, Copyright 2012 ACM.

Raj, Pethuru, "Cloud-based Greener and Smarter Service Environments," International Journal of Computing Technology and Information Security, vol. 1, No. 1, pp. 14-23, Mar. 2011 <http://www.ijctis.com/upload/IJCTIS%20-%20issue%201%20-%20final%20V3.pdf#page=17>.

RAND Europe. "Working Paper—Smart Trash: Study on RFID tags and the recycling industry," Interim Report (D3) Smart 2010/0042, Feb. 2012, pp. iii-255 <http://www.rand.org/pubs/working_papers/WR922.html>.

Yang et al. "A Cloud Architecture Based on Smart Home," 2010 Second International Workshop on Education Technology and Computer Science (ETCS), vol. 2, pp. 440-443, Mar. 6-7, 2010, IEEE Computer Society, doi: 10.1109/ETCS.2010.293.

"Cloud Computing", Wikipedia, the free encyclopedia, page last modified on Apr. 18, 2013 at 14:21, <https://en.wikipedia.org/w/index.php?title=Cloud_computing&oldid=550979975>.

"Microsoft Big Data, Solution Brief," published Oct. 19, 2012, pp. 1-4, Copyright 2012 Microsoft Corporation <http://download.microsoft.com/download/F/A/1/FA126D6D-841B-4565-BB26-D2ADD4A28F24/Microsoft_Big_Data_Solution_Brief.pdf>.

"Middleware", Wikipedia, the free encyclopedia, page last modified on Apr. 9, 2013 at 12:54, <https://en.wikipedia.org/w/index.php?title=Middleware&oldid=549504491>.

* cited by examiner

CLOUD-CONNECTABLE MIDDLEWARE APPLIANCE

FIELD OF THE INVENTION

The present invention relates generally to the field of cloud computing, and more particularly to middleware used in cloud computing environments.

BACKGROUND OF THE INVENTION

Cloud computing is the use of computing resources delivered as a service over a communication network, such as the internet. The computer resources may be software, hardware, firmware or combinations of these computer resource types. Typically: (i) users (see definition, below, in Definitions sub-section of the Detailed Description section) access cloud-based applications through a web browser, a light-weight desktop or mobile app; and (ii) the business software and user's data are stored on servers at a remote location. Potential business advantages of cloud computing may include the following: (i) allows companies to avoid upfront infrastructure costs; (ii) allows companies to focus on projects that differentiate their businesses instead of infrastructure; (iii) allows enterprises to get their applications up and running faster, with improved manageability and/or with less maintenance; and/or (iv) enables IT (information technology departments) to more rapidly adjust resources to meet fluctuating and/or unpredictable business demand. Typically, cloud providers: (i) manage the infrastructure and platforms that run cloud applications; and (ii) effect sharing of computing resources in order to achieve coherence and/or economies of scale.

For purposes of this document, middleware is defined as computer software that provides services to software applications beyond those available from the operating system; and middleware is not part of an operating system, not a database management system, and neither is it part of one software application. Typically, middleware facilitates computer communication and input/output.

SUMMARY

According to an aspect of the present invention a method includes the following steps (not necessarily in the following order): (i) requesting a service by communication of a first service request; and (ii) creating a first cloud event data object based upon the first service request. The first service request is of at least one of the following types: (i) service request from a middleware appliance server to a cloud, and (ii) service request from a cloud to a middleware appliance server.

DETAILED DESCRIPTION

Figure 1:
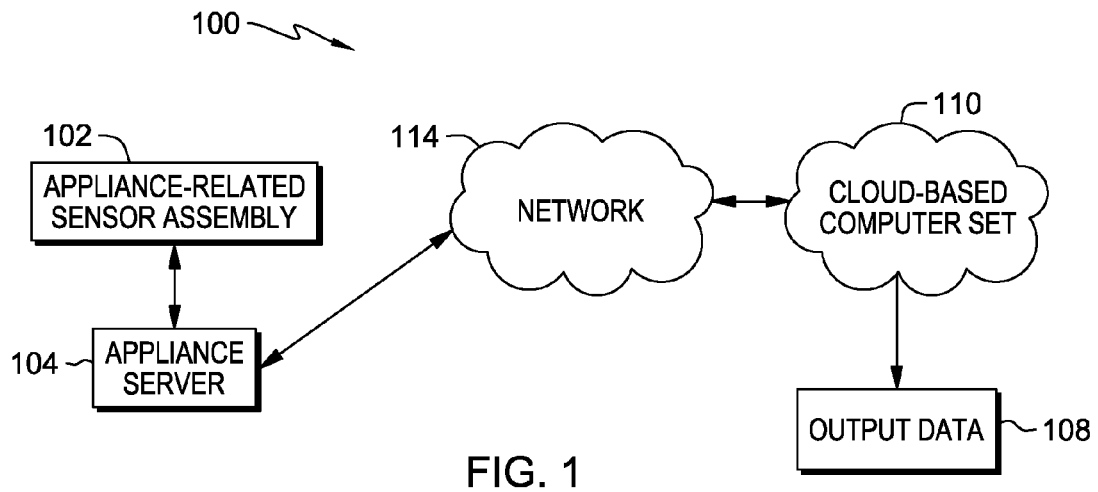
FIG. 1 is a schematic view of a first embodiment of a computer system (that is, a system including one or more processing devices) according to the present invention.

This Detailed Description section will be divided into the following sub-sections: (i) The Hardware and Software Environment; (ii) Operation of Embodiment(s) of the Present Disclosure; (iii) Further Comments and/or Embodiments; and (iv) Definitions.

Based on the foregoing, a computer system, method and program product has been disclosed for a predictive fault location system. However, numerous modifications and substitutions can be made without deviating from the scope of the present invention. Therefore, the present invention has been disclosed by way of example and not limitation.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA (a commercially available operating system for a virtual machine) (note: the term(s) "JAVA" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 2:
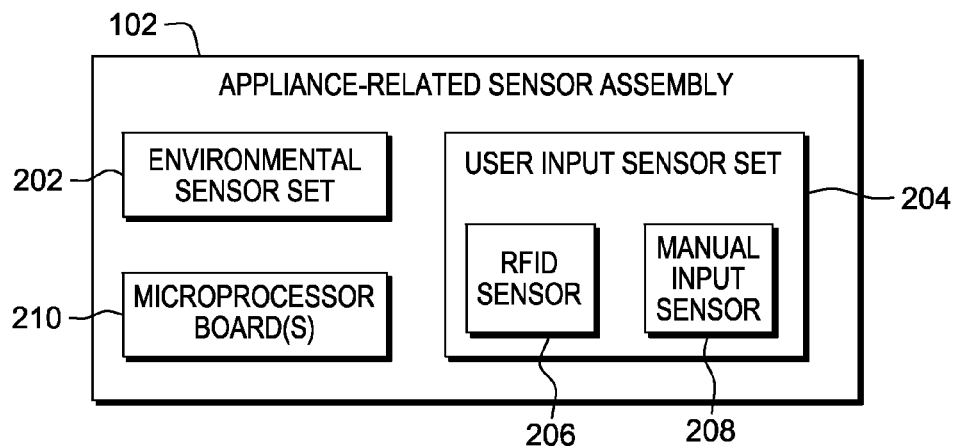
FIG. 2 is a schematic view of an appliance-related sensor portion of the first embodiment computer system.
Figure 3:
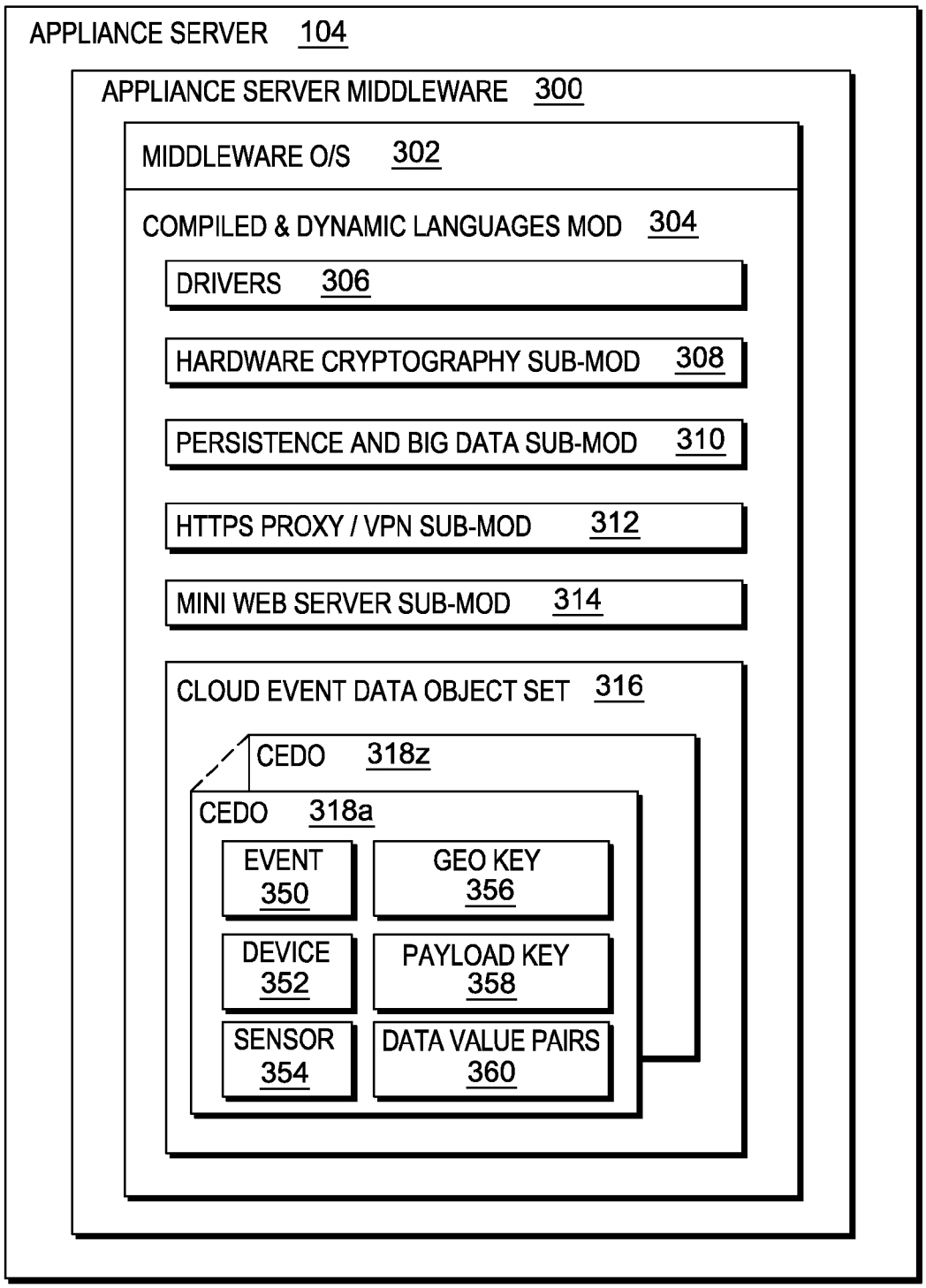
FIG. 3 is a schematic view of an appliance server portion of the first embodiment computer system.
Figure 4:
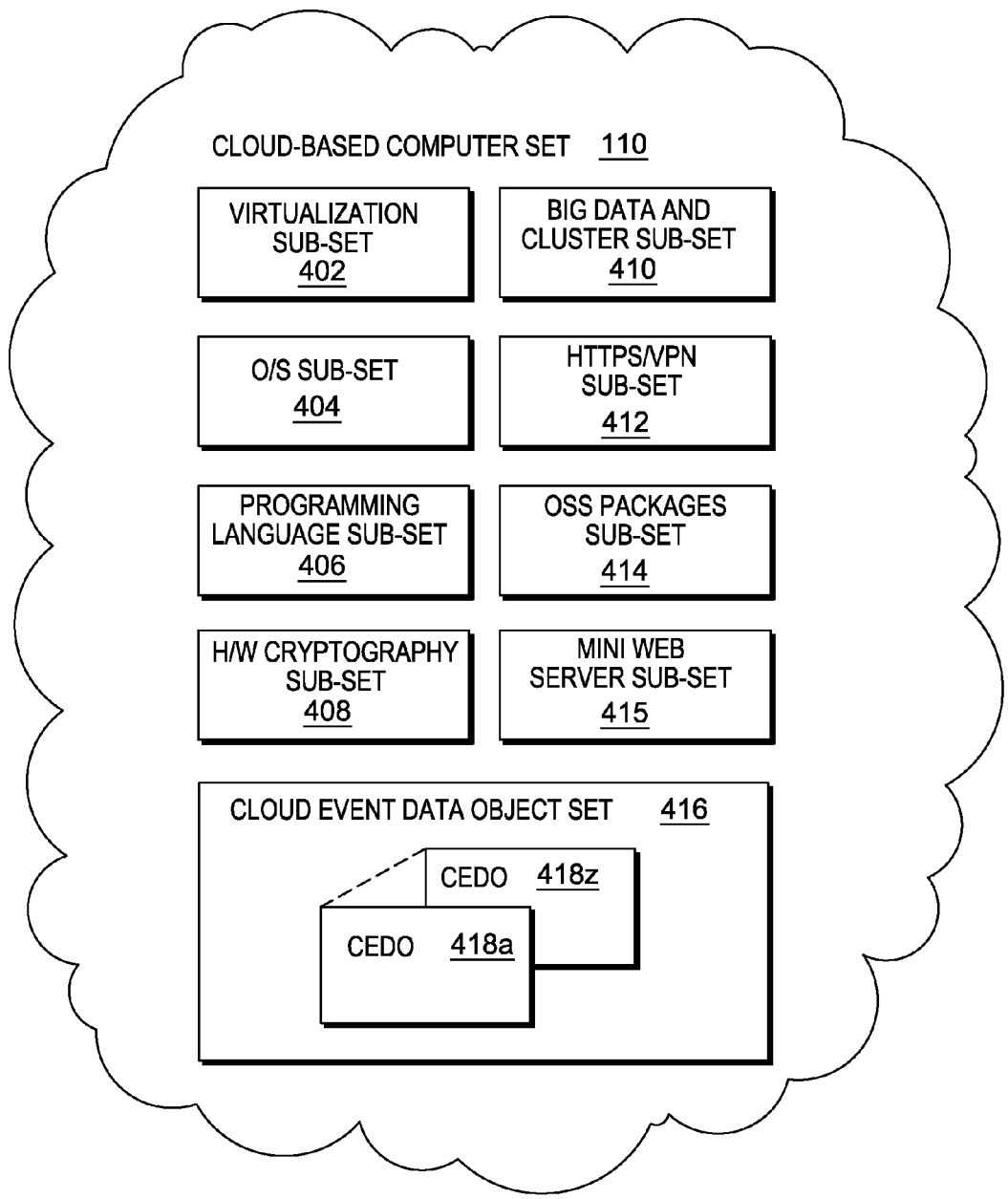
FIG. 4 is a schematic view of a cloud based computer set portion of the first embodiment computer system.
Figure 5:
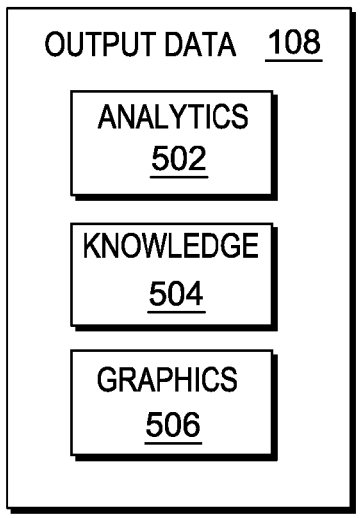
FIG. 5 is a schematic view of an output data portion of the first embodiment computer system.

FIGS. 1 to 5 show the hardware and software of appliance control system 100 according to an embodiment of the present disclosure. System 100 includes: appliance-related sensor assembly 102; appliance server 104; output data 108; cloud-based computer set 110 and communication network 114. As shown in FIG. 2, appliance-related sensor assembly 102 includes environmental sensor set 202; user input sensor set 204 (including RFID (radio frequency identification) sensor 206 and manual input sensor 208); and microprocessor board 210. As shown in FIG. 3, appliance server 104 includes appliance server middleware 300, which includes: middleware operating system 302; and compiles and dynamic languages module (mod) 304. Compiled and dynamic languages mod 304 includes: drivers 306; hardware cryptography sub-mod 308; persistence and big data sub-mod 310; https (hypertext transfer protocol) proxy/vpn (virtual private network) sub-mod 312; mini web server sub-mod 314; and cloud event data object (cEDO) set 316; cEDOs 318a to z (with each cEDO 318a to z including event data 350, device data 352, sensor data 354, geo key data 356, payload key data 358 and data value pairs 360. As shown in FIG. 4, cloud-based computer set 110 includes virtualization sub-set 402; operating system (O/S) sub-set 404; programming language sub-set 406; hardware cryptography sub-set 408; big data and cluster sub-set 410; https/VPN sub-set 412; OSS (open source software) packages sub-set 414; mini web server sub-set 415; cEDO object set 416; and cEDOs 418a to z. As shown in FIG. 5, output data 108 includes analytics 502; knowledge 504 and graphics 506.

System 100 is used to control and to obtain data from appliance control sensors. The data from the appliance control sensors is then used as input to control the operation of the appliances. For example, the appliance control sensor may be a temperature sensor, with the associated appliance being a building heating and cooling appliance. The sensors are of different type and usually act on an event base, like for example a temperature change, or an RFID (radio frequency identification) tag read event. In some embodiments, the sensors transmit the data over a unidirectional communication path. In other embodiments, the sensors are also prepared to answer to read requests received over a bidirectional communication path. In the remainder of this sub-section, many of the components of system 100 will be briefly identified and discussed. In the following sub-section, below, of this Detailed Description section, a data construct called a cEDO will be discussed in detail with respect to its role in operations of system 100.

Referring now to FIG. 1, appliance server 104 and appliance-related sensor assembly 102 communicate data locally, in a two way fashion. Note that sensor "assembly" 102 is not necessarily located within a single housing, and may be made up of many different types of sensors, distributed in space "locally" over the space of a room, structure (for example, building, stadium) or set of structures. Communications from appliance server 104 to the various appliance sensors of assembly 102 will generally include commands regarding the manner in which the sensors are to operate. Communications from assembly 102 to appliance server 104 will generally include sensor data (for example, a temperature, a position, moisture, movement, etc. sensed by the various sensor(s) of assembly 102). In this embodiment, the form, formal, protocol, communication layer, encapsulation, packetization, etc. of communication between appliance server 104 and assembly 102 is conventional for local appliance servers and need not be discussed here in detail. Further features and/or possibilities for the manner of this communication is discussed, below, in the Further Comments And/Or Embodiment(s) sub-section of this Detailed Description section. The data communication (see definition, below, in the Definitions sub-section of this detailed description section) between assembly 102 and appliance server 104 may be wired and/or wireless.

Continuing to refer to FIG. 1, appliance server 104 and cloud-based computer set 110 communicate data in a two way fashion. In this embodiment, the components of set 110 are widely and dynamically dispersed as a "cloud." Alternatively, set 110 could be a single remote server computer.

Communications from appliance server 104 to cloud-based computer set will generally include sensor data that appliance server 104 has received from assembly 102, as discussed in the previous paragraph. Communications from cloud-based computer set 110 to appliance server 104 will generally include commands to do one or more of the following things: (i) control the sensor(s) in some way; and/or (ii) to send sensor data to the cloud. In this embodiment, the form, formal, protocol, communication layer, encapsulation, packetization, etc. of communication between appliance server 104 and cloud-based computer set 110 is largely, or entirely, by a data construct called a cEDO, which cEDOs are communicated over network 114. These cEDOs are discussed, below, in the Operation of Embodiment(s) of the Present Disclosure sub-section of this Detailed Description section. The data communication between network 114 and appliance server 104 may be wired and/or wireless.

Continuing to refer to FIG. 1, cloud-based computer set outputs output data 108. As shown in FIG. 5, the output data includes: (i) data gleaned from analytics, which is herein called analytics 502; (ii) data in the form of knowledge, which is herein called knowledge 504; and (iii) graphics 506. An example of graphics output is shown in graph 599, which shows a graph of sensed temperature over time. In this embodiment, there is a low latency between the sensing of a temperature by a sensor, and its receipt and processing (for example, graphics processing) by the cloud. This latency is about two seconds, and will likely be even lower in the future.

Referring now to FIG. 2, environmental sensor set is the set of sensors that sense data (for example, temperature, smoke, vibration, movement, light, humidity, standing fluid, radioactivity) about the local environment in the vicinity of the sensor. In this embodiments, the sensors, the form and format in which the sensors receive commands (if any) and the form and format in which they output sensed data is conventional. The sensed data is sent to microprocessor board 210, which sends it, again in a conventional fashion in this embodiment, to appliance server 104, as discussed above. Any commands to the sensors come through microprocessor board 210 to the appropriate sensor(s). As mentioned above, there may be more than one environmental sensor, with the sensors being distributed in space, there may also be more than one microprocessor board. In this embodiment, the entire sensor set shares a single microprocessor board.

In this embodiment, the microprocessor board simply: (i) depacketizes, and sends over appropriate communication links, commands being sent from appliance server 104 to the various sensors of environmental sensor set 202; and (ii) packetizes, and sends over the appropriate communication link, sensor data being sent from various sensors of sensor set 202 to appliance server 104. Alternatively, in other embodiments, the microprocessor board(s) may change the form and format of commands and/or sensor data as they are communicated through the microprocessor board(s). Also, in some embodiments, the communications between the microprocessor board(s) and the appliance server may not be packetized.

Continuing to refer to FIG. 2, user input sensor set 204 accepts user input: (i) from RFID tags through RFID sensor 206; and (ii) from human input through a human interface in the form of manual input sensor 208.

Referring now to FIG. 3, compiled and dynamic languages module 304 (see definition of module, below, in the definitions sub-section of this Detailed Description section) includes hardware and software. The software of mod 304 runs on middleware OS 302. Middleware is a separate layer, not directly integrated into the OS. In some embodiments, the middleware layer is agnostic to the lower, OS bases layers. A dependency exists as middleware makes use of basic OS services. The separation and abstraction is the same as compared to common programming languages, like JAVA or PYTHON (a commercially available dynamic, general purpose programming language). Some embodiments are portable between at least three OS systems as follows: WINDOWS (a commercially available operating system) (32 bits), Linux (amd64) and zLinux (s390x). (Note: the term(s) "LINUX," "WINDOWS" and/or "PYTHON" may be subject to trademark rights in various jurisdictions throughout the world and are used here only in reference to the products or services properly denominated by the marks to the extent that such trademark rights may exist.)

Compiled and dynamic languages mod 304 includes the following sub-modules: (i) drivers 306 which includes driver software for the various sensors (some embodiments support compiled languages and also support use of dynamically interpreted languages); (ii) hardware cryptography sub-mod 308 which encrypts and decrypts the substantive data of the cEDOs; (iii) persistence and big data sub-mod 310 which specifies the manner in which cEDOs are to be reported to, saved in and/or analyzed by the computing resources in the cloud (some embodiments make use of high performance, hardware assisted cryptography at a data object level, preserving verity of the original event information); (iv) HTTPS (hypertext transfer protocol) proxy/VPN (virtual private network) sub-mod 312 which manages proxies for and virtual private network communications of cEDOs for secure and reliable network communications between appliance server 104 and various cloud computing resources; (v) mini web server 314.

As shown in FIG. 4, cloud-based computer sub-set includes: (i) virtualization sub-set 402 which performs various virtualization-related tasks associated with the cEDOs and the various middleware appliance servers system-wide; (ii) operating system ("O/S") sub-set 404 which performs various O/S-related tasks associated with the cEDOs and the various middleware appliance servers system-wide; (iii) programming language sub-set 406 which performs various programming-language-related tasks associated with the cEDOs and the various middleware appliance servers system-wide; (iv) hardware cryptography sub-set 408 which encrypts and decrypts the data of the cEDOs for security reasons; (v) big data and cluster sub-set which manages storage, analysis and/or analytics of the cEDOs; (vi) HTTPS/VPN sub-set 412 which performs proxy and VPN communication-related tasks associated with communication of the cEDOs; (vii) OSS (open source software) packages sub-set which performs various open-source-software-related tasks associated with the cEDOs and the various middleware appliance servers system-wide; and (viii) mini web server sub-set 415.

II. Operation of Embodiment(S) of the Present Disclosure

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
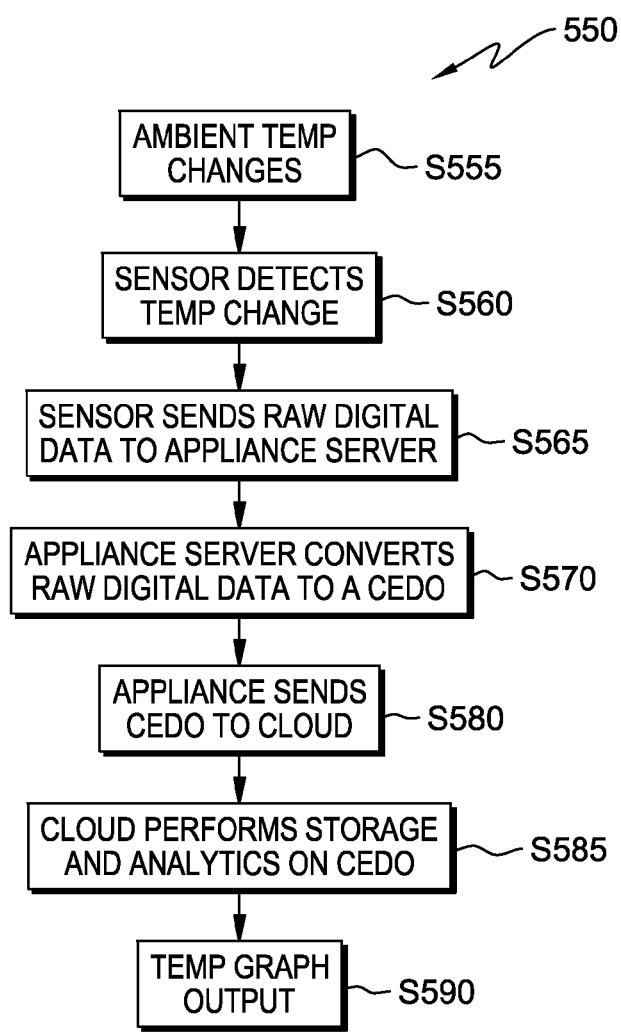
FIG. 6 is a flowchart showing a process performed, at least in part, by the first embodiment computer system.

FIG. 6 shows a flow chart 550 depicting a method according to the present disclosure. Processing starts at step S555 where ambient temperature in a building (not shown in the Figures) changes.

Processing proceeds to step S560 where a sensor of sensor set 202 (see FIG. 2), which is located in the building, detects the change with its temperature detection hardware (not separately shown in the Figures).

Processing proceeds to step S565 where the sensor of sensor set 202 sends raw digital data, indicating the new ambient temperature, to appliance server 104 (see FIG. 1). Actually, in this embodiment, the new temperature data is packetized by microprocessor board 210 on its way from the sensor to appliance server 104, but the data itself is not otherwise processed, and will have a form and format according to that designed or used by the designer of the particular sensor hardware used to detect the new temperature. The temperature data may be sent from the sensor to the microprocessor board and from the microprocessor board to appliance server 104 by wired and/or wireless connections. Because the appliance server is middleware, it is located in the same building, or campus, as the sensor, but the appliance server may still be at some "local" distance from the sensor and/or microprocessor board.

Processing proceeds to step S570 where appliance server 104 converts the raw temperature data from the sensor into a data object, specifically cEDO 318a. More specifically, software in cEDO set 316 (see FIG. 3) creates cEDO 318a corresponding to the temperature data. As shown in FIG. 3, cEDO 318a is a data structure that includes several components that will be respectively discussed in the following paragraphs.

Event data 350 is a payload, typically with an undefined internal structure, except the fact that it satisfies the condition of a data object, folded into the cEDO object headers.

Device data 352 corresponds to the appliance itself (for example its unique MAC address), each microprocessor board (/dev/ttyUSBx) and sensor (port x) is identified individually by its payload data. Device data is detected at several layers.

Sensor data 354 which corresponds to the identity of the sensor that generated the temperature data. While some embodiments of the present invention do not include make, model and/or location of the sensor in the sensor data, some of these embodiments use geo-localization delivered by the appliance, which is designed to be small with highly distributed use, including support for connection of low-cost GPS devices. This can avoid the necessity of a GPS device being added to each sensor, which tends to greatly increase the cost.

Geo key data 350 is further explained, below in the Further Comments and/or Embodiment(s) sub-section of this detailed description section.

Payload key data 358 fosters analytics with big data and applies the NoSql technology, mainly useful for faster data search and parse in NoSQL data stores—it is somewhat similar to a set of tags in a search engine search space.

Data value pairs 360 are part of the standard specification of data objects, regardless if its representation is written as a JAVA bean, or a PYTHON object, or a XML object, or a JSON object. The key value pairs are also applicable for building structures which contains the layer name and a list of elements. Syntax references are publically available and known by those of skill in the art.

The cEDO created at step S570 may be one of several different types, such as: (i) JAVA Data Object (bean) with common functions, set get and toString( ); (ii) PYTHON data Object (DO) with common functions .Array.append (key, Array[key]and .str(Array[key]); and/or (iii) matrices with data type support (array).

Processing proceeds to step S580 where appliance server 104 sends cEDO 318a, as a data object, over network 114 to various destination(s) in cloud-based computer set 110 (see FIG. 1). Because the data is going to various destinations at various locations in the cloud for various purposes, it is helpful that the temperature change data is in the form of a cEDO. In this way, all the computers system-wide can understand the new temperature data, and its manner of collection, fully, without requiring the computers in the cloud to have software especially designed and/or programmed to handle data from the specific kind of sensor that actually sensed the new temperature data in the first place.

Processing proceeds to step S585 where various cloud computing resources in cloud-based computer set 110 (see FIG. 4) respectively perform storage, analytics and/or other responsive operations using the data in the cEDO. For example, cloud event data object set 416 stores the data object as cEDO 418a. Big data and cluster sub-set 410 direct further storage, analysis and/or analytics in accordance with big data functions and principles. Mini web server 415 uses the updated temperature to fashion a command to the buildings heater so that the temperature does not drop too much, in view of the new temperature revealed in cEDO 318a/418a. This command to the buildings heater may also be stored, and communicated to appliance server 104, in the form of a new cEDO. The cEDO data envelope is capable of bidirectional communication, using unrelated and distinct queues, what allows easy separation of command (act) and read (reaction). The cEDO is a wrapper format for a common command and data interchange. The architecture integrates into several transport M2M mechanisms, like MQTT protocol, or HTTP protocol combined with REST/JSON data, or NoSQL distributed database replicas implemented at Redis, or Riak, or others.

At step S585, the received cEDO 418a may need to be decrypted by hardware cryptography sub-set 408 before the data can be understood by the various cloud computing resources.

Figure 7:
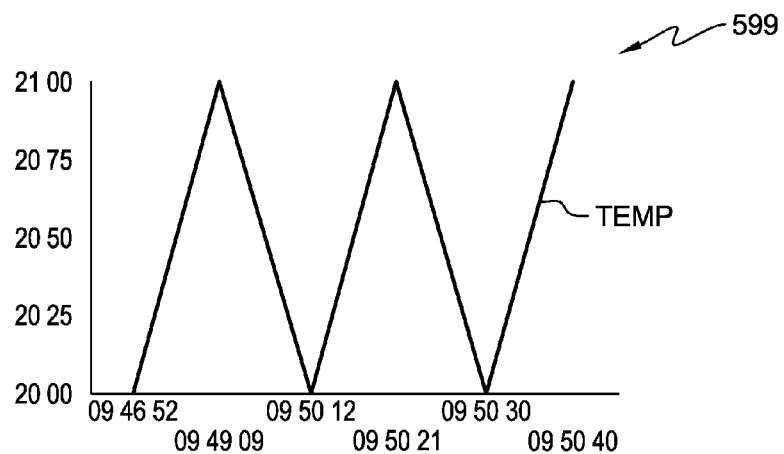
FIG. 7 is a graph showing control of temperature facilitated by the first embodiment computer system.

Processing proceeds to step S590 where mini web server sub-set 415 (see FIG. 4) uses the data of cEDO 418a to help draw graph 599, as shown in FIG. 7 and discussed above.

III. Further Comments and/or Embodiments

Some embodiments of the present disclosure may have one, or more, of the following features, characteristics and/or advantages: (i) enable a concept known as "Internet of Things;" (ii) implement a "Machine to Machine" (M2M) connection in a space that is cloud computing oriented; and/or (iii) produce "machine-friendly" data resources and collections that foster and/or facilitate machine logic based analytics.

Some embodiments of the present disclosure are directed to an appliance, or "box," that: (i) connects customers to the cloud; (ii) is considerably less expensive than currently conventional systems for connecting customers to the cloud. Some embodiments of the present disclosure include a system that networks using a software/hardware combination that focuses on the software providing many of the cloud connection capabilities. Some embodiments of the present invention may be designed for growth markets, where resources are not as readily available. Some embodiments of the present disclosure include a middleware stack that enables straightforward integration with the principle of cloud for a fraction of the cost for similar, currently conventional systems. Some embodiments of the present invention leverage relationships between and among the following areas: (i) Physical; (ii) Digital; (iii) Cloud; (iv) Big Data; and/or (v) Analytics. Some embodiments of the present disclosure include middleware that does not define a strict client/server relationship between the box and the cloud, but rather is based on a principle that all interactions are based on function and bidirectional work-flow. Some embodiments of the present invention include a data model that is flexible, extensible and based on modern specifications. Some embodiments of the present invention include data transport through middleware that is inherently secure.

Some embodiments of the present disclosure may include one or more of the following features, characteristics and/or advantages: (i) "Analog meets Digital" though secure communication and integration of IBM's cloud computing resources; (ii) "Information meets Knowledge" through the power of IT based analytics and big data; (iii) inexpensive, high quality techniques for real-time monitoring; (iv) standards-based networking using internet-protocol-based LAN (local area network) and wireless wifi networks; (v) no requirement for proprietary bus technology; (vi) openness following the principles of SDN (software defined networking); (vii) simply the management of things (analog and digital sensors and device control); (viii) digital convergence enabling smarter analytics through integration of events, data acquisition, connectivity and cloud resource; (ix) improved reliability of digital monitoring; (x) improved coverage; and/or (xi) improved level of security for cloud-based interactions.

Some embodiments of the present disclosure define a middleware stack that enables straightforward integration with the principle of cloud computing based on one or more of the following: (i) RESTful (Representational State Transfer) interfaces; (ii) the JSON (JavaScript Object Notation) standard; and/or (iii) hardware-assisted AES (Advanced Encryption Standard) encryption techniques. Some embodiments of the present disclosure may support one or more of the following: (i) multiple platforms; (ii) multiple programming languages; and/or (iii) multiple encoding schemes.

Figure 8:
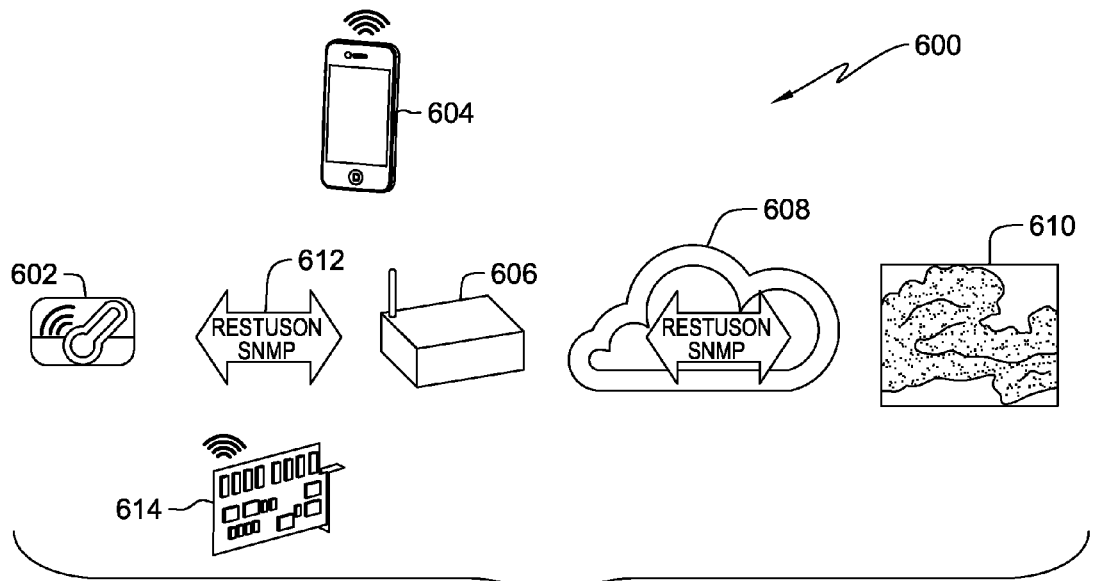
FIG. 8 is a schematic view of a second embodiment of a computer system (that is, a system including one or more processing devices) according to the present invention.

FIG. 8 shows system 600 in which a middleware appliance interacts with a cloud computing resource. Diagram 600 includes: IP (Internet Protocol, more precisely, the robust implementation branch of it, which is: Transmission Control Protocol/Internet Protocol) sensor set 602 (including luminosity sensor, temperature sensor, pressure sensor, consumption sensor, smoke sensor, motion sensor, water sensor, etc.); smart phone 604; appliance server 606; enterprise-level virtual private network (VPN) 608; enterprise-level cloud 610; local area network (LAN) 612; and open source hardware platform sensors 614.

Appliance server 606 is: (i) equipped with a platform for building and running Web 2.0 based applications using service oriented architecture (SOA) principles; and (ii) configured as a middleware broker. Both VPN 608 and LAN 612 use: (i) JavaScript Object Notation (JSON); and (ii) REST interface protocols. LAN 612 also uses Simple Network Management Protocol. Open source hardware platform sensors 614, in this embodiment, uses the open source hardware platform called Arduino.

Middleware appliance server 606 is a low cost appliance that interfaces with SMBs (Server Message Block compatible devices) in GMUs (Growth Market Unit) with the cloud. GMU is a target market initiative that addresses prospecting of the emerging nations and members of organizations dedicated to the interests of emerging nations. Appliance server 606 implements machine readable code and solutions with samples available as open-source code. A primary aspect of the idea of appliance server 606 is that it is oriented in a consumer application environment. There are several potential use cases and environments for the present invention, like Real Estate Asset Management (Intelligent Building), Industrial Sensors (Plant Control), Transports (Logistics), Agriculture (Tags), Civil Defense (Meteorology and Alerts), military applications and many others. In some embodiments, there is no substantial difference in the use concept between different environments, as the data layer is well designed with a flexible payload definition. In some embodiments, an accidental change between unequal environments is not supported as the encryption step is a mandatory part of the process. In some embodiments, unauthorized access to protected data will lead to unreadable data.

The solution of appliance server 606 has a well defined information flow, in a chain connecting the following components as follows: Physical<=>Digital<=>Cloud<=>BigData<=>Analytics. A middleware appliance (such as appliance server 606) is hereby defined as a set of intermediaries for the components in a distributed computing system, connected to a cloud. Middleware appliances according to some embodiments of the present invention include functionality that goes beyond a traditional message queue, service oriented architecture (SOA), or web services (WS) interface design. There is no strict client/server relationship in this cloud based middleware model embodied as system 600.

Some operations and/or characteristics of appliance server 606 are as follows: (i) cloud 610 requests a service from appliance server 606 via REST (for example, a data acquisition request); (ii) appliance server 606 requests a service from cloud 610 via REST (for example, a web service for a user authentication); (iii) appliance server 606 stores some data as cEDO (cloud event data object) data units inside the cloud storage resource for purpose of persistence; (iv) appliance server 606 interconnects to the physical world by standard interfaces and protocols (Wifi, LAN (large area network), Bluetooth, IP SNMP (Simple Network Management Protocol), serial, infrared and usb (universal serial bus)); (v) appliance server 606 performs various functions with the support from standards-based, digital instrumentation (SNMP); (vi) appliance server 606 is secure and equally shielded as the inner cloud "core" components (inner cloud core components are grouped around one application purpose regardless where the resource is located physically, but inside a cloud infrastructure); (vii) appliance server 606 includes off-the-shelf hardware; (viii) the middleware solution of appliance server 606 is mostly software driven (except for some aspects of cryptography, which are hardware assisted in this embodiment).

One scenario supported by an embodiment according to the present disclosure will now be discussed. In this embodiment, the model defines a simplification using RESTful transaction handling by means of the JSON standard, implemented as a base framework for cloud connectivity. The JSON will transport the data and a RESTful mechanism will process it using the CRUDL pattern (create-read-update-delete-list).

Another scenario supported by an embodiment according to the present disclosure will now be discussed. In this embodiment, for raw data capturing, the appliance server (for example, appliance server 606, discussed above) associates a key value and stores the information in a big data repository. This will herein be called cEDO repository storage. A common format is used which is named cEDO. As an addition or alternative to REST, a NoSQL tool can be used to provide persistence.

Another scenario supported by an embodiment according to the present disclosure will now be discussed. In this embodiment, simple data acquisition is accomplished through common physical interfaces, like serial and USB. All raw data is converted into a cEDO data wrapper and stored by cEDO repository storage.

Another scenario supported by an embodiment according to the present disclosure will now be discussed. In this embodiment, SNMP Wifi (LAN) connectivity acts as a proxy gateway sending trap and get requests and receiving data blocks. SNMP data is converted into a cEDO data wrapper and stored by cEDO repository storage. A reconstructed and forwarded SNMP protocol message reaches a NMS monitoring station connected to the cloud (proxy), or the appliance server (for example, appliance server 606) is programmed and/or set up to act like an NMS (Network Management System) getter.

Returning to system 600, shown in FIG. 7 and discussed above, the security is treated in a uniform way using the Advanced Encryption Standard (AES) algorithm based on the principle of symmetric encryption. The AES feature uses a hardware assisted cryptography feature, at the central cloud, as well as at the appliance server 606. This feature gives an overall protection to the appliance server as well as to all information in a transit state.

In system 600, the application code base has one or more of the following features and/or characteristics: (i) open; (ii) extensible; and/or (iii) new modules follow the same programming pattern, set of specifications and/or components used by the middleware. In this way, appliance server 606 is easy to extend with enhancements. This effectively transforms appliance server 606 into a suitable "point-of-presence" for all type of home-oriented applications. It should be understood that the middleware layer is not usually limited to appliance server 606. In this embodiment, appliance 606 is a physical box, that is a turnkey device including: OS, procedures, cryptography and connectivity as well as a middleware layer. The "middleware layer" is an isolated functional specification which describes how the event data is transported over the network reaching the cloud. Because the appliance server 606 is compatible with this middle layer, it can be described as a middleware appliance server.

Some embodiments of the present disclosure include a SDN (software defined networking) for building a platform for connecting to a cloud. This disclosure: (i) identifies a way to build a SDN on inexpensive hardware; and (ii) defines the data objects that drive the functionality. Some embodiments of the present disclosure include a design built from the ground, initially based on software components with concepts that, in the future, will likely move into ASICs (application-specific integrated circuits). Some embodiments of the SDN of the present disclosure will create new points of presence, connected with a large capacity backbone and cloud computing resources of the most recent generation, delivered in the conventional manner, by satellite, or by fiber.

The dimensioning of modern buildings, growing urban occupation, traffic and transportation systems produce an increased complexly with demand for planning, decision management and growing need in energy. Big cities are not reasonably considered to be self-organizing entities. Much information is needed to take a right decision at the right time. To build a municipal operation center is a pro-active answer for this challenge. This approach can also been targeted at a more distributed level, like for example inside a shopping center administration, or in an industrial campus, or in a large commercial building. The data acquisition process now is part of modern architecture, which includes the concept of intelligent buildings.

Some embodiments of the present disclosure might also be a turnkey solution for delivery of an infrastructure (GTS (global technology services)), or a complementary data acquisition device for a software based management solution. The product design is also a suitable platform for building tailored, case-by-case integration studies delivered by application services. Its applicability and bright spectrum helps to customize specific customer requests and develop a tailored, software-driven solution which translates the core of intelligent control of resources.

The cloud Event Data Object (cEDO), mentioned above, will now be described. This is a proposal for an event oriented data object design which extends the principle of a common JSON data structure. The specification applies to the data object factories supported by several programming languages. The layout accommodates a set of information regarding: (i) the event recording mechanism, like time and date; (ii) an interval between measurement; (iii) an event related payload information; and/or (iv) transfer of user location information.

The object description is abstract and its implementation might differ between the programming languages chosen, like PYTHON and PYTHON DO, JAVA and Groovy bean, or others. (Note: the term(s) "GROOVY" may be subject to trademark rights in various jurisdictions throughout the world and are used here only in reference to the products or services properly denominated by the marks to the extent that such trademark rights may exist.)

A simplified and common data object structure is designed to work in conjunction with a memory addressing process which stores all events in a memory based matrix. The 64-bit architecture of cloud computing resources is able to address terabytes of data space and organize it very quickly in RAM (random access memory). The data object is also useful for filtering and grouping of raw data supported by modern NoSql (Not only SQL) database tools, RAM data persistence tools and analytics. In some embodiments of the present disclosure, the middleware appliance server concept integrates seamlessly into the cloud computing landscape.

The data exchange in the economical middleware appliance server uses a unified object format for data acquisition sent by the instruments and sensors. The middleware appliance server adds a persistence-oriented layer with support for queuing, replica and long term data store. In some embodiments of the present disclosure, the basic data object transported by the solution is called a cloud Event Data Object (cEDO). The cEDO integrates into a larger concept that can be fairly described as instrumented, interconnected and intelligent. As used herein, "instrumented" means covered by microprocessor boards which implement the conversion of analog sensor measurements to the digital data acquisition protocols, with instruments connected by USB and serial interfaces, Wifi and XBee connectivity or LAN based IP SNMP sensors. As used herein, "interconnected" means covered by embedded hardware devices (for example, posix or Linux hardware devices), a small box and a middleware appliance server according to the present invention.

Some embodiments of the present disclosure will have one or more of the following features, characteristics or advantages: (i) an "embedded web server" will set up the middleware appliance server and "boot" it into a normal operational state, similar to conventional booting of wireless routers; (ii) the middleware appliance server connects to an enterprise VPN (virtual private network) according to the concepts defined by the "virtual Branch Office in a Box" (a general purpose access device that acts like a virtual network client, specially useful for as a router device for connectivity and digital inclusion); and/or (iii) encryption support is implemented at the Middleware hardware level using the AES cryptography standard.

As used herein, "intelligent" means that the solution supports a wide range of cloud computing oriented applications and open-source packages for analytics and big data, among many others packages solutions, like PYTHON Numpy, Matplotlob, Redis, Riak and Apache Hadoop. (Note: the term(s) "PYTHON Numpy," "Matplotlob," "Redis," "Riak" and/or "Apache Hadoop" may be subject to trademark rights in various jurisdictions throughout the world and are used here only in reference to the products or services properly denominated by the marks to the extent that such trademark rights may exist.)

Data object structure will now be discussed. The purpose of cEDO is to construct a common data structure that includes all basic information like, for example, the following: (i) the current API version; (ii) the encoding standard used; (iii) the event date and time; (iv) the time-zone; (v) the geo-location; (vi) the measurement time interval; (vii) the middleware appliance server address; and/or (viii) the sensor type. The header data normally relates to the middleware appliance server's "point of presence." The payload specific data relates to the connected sensors and are included in a nested layer, which describes the characteristics and the full details obtained from the sensor measurement. Each time an event is fired, the data is captured and a message is built and sent to the middleware appliance server's data handler component. A typical example for an event driven operation is the reading of an Radio Frequency Identification (RFID) tag. Optionally, the event could also be triggered by an SNMP Get Request so that the appliance acts like a proxy. The cEDO common data structure may have the following characteristics, features and/or advantages: (i) supports a wide number of sensors and simplifies the data acquisition process, as well as the subsequent data storage and analytics phase; (ii) has a payload that encapsulates diverse types of data, even binary data (for example, an MPEG-4 video stream, or attached files or documents) which are framed for reliable packetized transport; (iii) the entire data object passes a cryptography step, based on an AES standard process, right before the message leaves the middleware appliance server. From a programmatic standpoint the data object follows a common pattern implemented, both in the JAVA beans, as well as specified in the PYTHON data object guidelines, following well known patterns, such as: (i) a full implementation of "setter" and "getter" methods; (ii) string conversion; and (iii) direct access to the class variables. Data objects used to be generated by object factories. A data object is an abstract definition, comparable to a template, while the object factory implements one or multiple instances of that object, mapping the event data (entity) into the object structure.

The cloud connection has at least two alternative implementation choices, according to the cloud server requirement, as follows: (i) using the REST/JSON encapsulation connected to a relational database; (ii) using the key/value principle implemented by a distributed NoSQL database. For NoSQL, a unique key must be reserved, which by recommendation follows a structure of cEDO_+_bucket+_current ISO date+_unique ID.

Some embodiments of the present disclosure may have the following event flow: (i) measurement data; leads to (ii) payload; leads to (iii) cEDO common data object; leads to (iv) encryption (associated with one or more keys); leads to (v) distributed database replica; leads to (vi) decryption to yield decrypted cEDO common data object; leads to consumption for analytics. In this exemplary event flow the estimated processing time per message is less than a second. An exemplary key structure is as follows: cEDO_:queue_name:date:id:data.

Some embodiments of the present disclosure may have one or more of the following features, characteristics and/or advantages: (i) accelerated the event flow; (ii) production of an information-rich, "big data" repository, ready for analytics and optimization; (iii) amenable to proprietary standards and the protection that proprietary standards can provide; (iv) simulates a functional test bed with common, low-cost lab components; (v) achieves results that can not be achieved, or are not necessarily reproducible, by using commercial software packages; (vi) apply to standard hardware components (boxes) from the shelf with embedded system and educational microprocessor boards, each designed for standard interfacing; (vii) small scale form-factor and affordable price allow a well-designed commercial product with low engineering investment; and/or (viii) leaves space for design and industrial production improvement, to lower the energy consumption.

Available resources are limited, such as energy, drinkable water and public transport. This causes a constant demand and pressure for optimization work, generating an entire new market segment that currently waits for affordable and comprehensive solutions for sensors, probes, RFID readers and event solutions which may be provided by some embodiments of the present disclosure. This segment is equally active in the growth market (GMU) of the developing nations, which have a chance to start with latest and best resource management and information technology. The design targets specifically the growth market segment, especially with embodiments of the present disclosure that deliver an affordable solution and architecture.

Some embodiments of the present disclosure allow a manufacturing company to reuse common commercial components and add value to the delivered turn key solution, based on the software (middleware, analytics and optimization) and service licenses (networking, hosting and cloud computing resources). In some embodiments of the present disclosure, lower hardware and software costs lead to a higher usage scale resulting in gains obtained from service licensing, which potentially can be a continuous source of revenue.

Some embodiments of the present disclosure may have one or more of the following features, characteristics and/or advantages:

(i) Sensors and meters that are physically connected though microprocessor boards using open source hardware (open source hardware is physical artifact of technology designed and offered by the open design movement);

(ii) A solution that will create a wider range of supported sensors and reader technology;

(iii) A first level protocol adoption layer (driver) implemented by an external microprocessor board (for example, Arduino, which is an open source physical computing platform based on a simple microcontroller board, and a development environment for writing software for the board);

(iv) Geo-localization data reading;

(v) A solution for secure data flow and processing;

(vi) Layers of abstraction to simply the process steps, such as request handling, event data acquisition, data object factory, encryption and protocol setup and data transmission;

(vii) Use of Non-Relational (NoSQL) principles in its conceptual design;

(viii) Sensor integration hardware is added directly to the mobile device;

(ix) A common data object is shared among unequal technology (that is, support of different hardware architecture and scale, as well as different programming languages);

(x) Use of memory array processing techniques;

(xi) Focus on high-level tasks such as collecting, storing, querying, and understanding sensor data;

(xii) Use of the cEDO data object model adds efficient packing layers which delivers a degree of abstraction useful to avoid protocol conversion practiced by existing Middleware data capturing and handling solutions;

(xiii) Acquires and stores context information (what, when, who, how, why) in a steady data stream, and/or triggered by events or requests;

(xiv) A software-based appliance which handles the cEDO data model for capturing, transmission and storage of sensor, meter and reader information;

(xv) Cloud and big data technology support secure processing and analytics in a close to real-time mode;

(xvi) Lightweight design for building hardware and software components with less complexity;

(xvii) Support of encapsulated payload layers, deriving from the principles of array processing, provides extensibility to different applications, without losing the benefit of having common data object structure and hardware assisted cryptography (a wrapper);

(xviii) Provides context awareness from the physical connection appliance (that is, the underlying drivers and interfaces, like unique MAC address and serial port maps and sensor ports) in middleware;

(xix) Geo-localization data is treated as a mandatory part of an asset, including the sensors, meters and readers;

(xx) Addresses distributed computing resources implemented by modern cloud computing architectures and big data and analytics, including support of non-relational databases and NoSQL features;

(xxi) Support for a two dimensional implementation which works well with commercial software packages like data warehouse and analytics packages; and/or (xxii) Support for a two dimensional implementation which works well with arising open-source tools, like memory matrix processing and non-relational databases.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: non-exclusive or; for example, A and/or B means that: (i) A is true and B is false; or (ii) A is false and B is true; or (iii) A and B are both true.

User/subscriber: includes, but is not necessarily limited to, the following: (i) a single individual human; (ii) an artificial intelligence entity with sufficient intelligence to act as a user or subscriber; and/or (iii) a group of related users or subscribers.

Electrically Connected: means either directly electrically connected, or indirectly electrically connected, such that intervening elements are present; in an indirect electrical connection, the intervening elements may include inductors and/or transformers.

Mechanically connected: Includes both direct mechanical connections, and indirect mechanical connections made through intermediate components; includes rigid mechanical connections as well as mechanical connections that allow for relative motion between the mechanically connected components; includes, but is not limited to, welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

What is claimed is:

1. A method comprising:

receiving, by a software based middleware appliance and from a cloud computing service, a first request for a service from the software based middleware appliance via representational state transfer protocol (REST) interfaces, with the software based middleware appliance:

is implemented a separate and discrete hardware device with integrated software, with the integrated software taking the form of middleware that acts as a bridge between an operating system and/or database and applications on a network, is secure and shielded, supports simple network management protocol (SNMP), supports hardware assisted advanced encryption standard (AES) cryptography, is connected in data communication with a first physical world interactive device, and includes an embedded web server;

responsive to receiving the first request, sending, by the software based middleware appliance and to the cloud computing service, a second request that requests a service via the REST interfaces;

receiving, by the software based middleware appliance, from the first physical world interactive device and using a lightweight data-interchange format defined using JavaScript Object Notation (JSON), with a first event data relating to an event in the physical world; and storing, by the software based middleware appliance, the first event data inside a storage resource of the cloud computing service for persistence in a manner that uses:

the hardware assisted AES cryptography supported by the software based middleware appliance, and a lightweight data-interchange format in a common format of a cloud event data object (cEDO) data units.

2. A computer program product comprising a non-transitory computer readable storage medium having stored thereon:

first program instructions programmed to receive, by a software based middleware appliance and from a cloud computing service, a first request for a service from the software based middleware appliance via representational state transfer protocol (REST) interfaces, with the software based middleware appliance:

is implemented a separate and discrete hardware device with integrated software, with the integrated software taking the form of middleware that acts as a bridge between an operating system and/or database and applications on a network, is secure and shielded, supports simple network management protocol (SNMP), supports hardware assisted advanced encryption standard (AES) cryptography, is connected in data communication a first physical world interactive device, and includes an embedded web server;

second program instructions programmed to responsive to receiving the first request, send, by the software based middleware appliance and to the cloud computing service, a second request that requests a service via the REST interfaces;

third program instructions programmed to receive, by the software based middleware appliance, from the first physical world interactive device and using a lightweight data-interchange format defined using JavaScript Object Notation (JSON), with the first event data relating to an event in the physical world; and fourth program instructions programmed to store, by the software based middleware appliance, the first event data inside a storage resource of the cloud computing service for persistence in a manner that uses:

the hardware assisted AES cryptography supported by the software based middleware appliance, and a lightweight data-interchange format in a common format of a cloud event data object (cEDO) data units.

3. A computer system for comprising:

a processor(s) set; and a computer readable storage medium;

wherein:

the processor set is structured, located, connected and/or programmed to run program instructions stored on the computer readable storage medium; and the program instructions include:

first program instructions programmed to receive, by a software based middleware appliance and from a cloud computing service, a first request for a service from the software based middleware appliance via representational state transfer protocol (REST) interfaces, with the software based middleware appliance:

is implemented a separate and discrete hardware device with integrated software, with the integrated software taking the form of middleware that acts as a bridge between an operating system and/or database and applications on a network, is secure and shielded, supports simple network management protocol (SNMP), supports hardware assisted advanced encryption standard (AES) cryptography, is connected in data communication a first physical world interactive device, and includes an embedded web server;

second program instructions programmed to responsive to receiving the first request, send, by the software based middleware appliance and to the cloud computing service, a second request that requests a service via the REST interfaces, third program instructions programmed to receive, by the software based middleware appliance, from the first physical world interactive device and using a lightweight data-interchange format defined using JavaScript Object Notation (JSON), with the first event data relating to an event in the physical world, and fourth program instructions programmed to store, by the software based middleware appliance, the first event data inside a storage resource of the cloud computing service for persistence in a manner that uses:

the hardware assisted AES cryptography supported by the software based middleware appliance, and a lightweight data-interchange format in a common format of a cloud event data object (cEDO) data units.

* * * * *